(12) United States Patent  
Kameda

(10) Patent No.: US 8,072,707 B2  
(45) Date of Patent: Dec. 6, 2011

(54) PERPENDICULAR MAGNETIC RECORDING HEAD WITH DIVIDED AUXILIARY YOKE LAYER

(75) Inventor: Hiroshi Kameda, Tokyo (JP)

(73) Assignee: TDK Corporation, Tokyo (JP)

( * ) Notice: Subject to any disclaimer, the term of this patent is extended or adjusted under 35 U.S.C. 154(b) by 864 days.

(21) Appl. No.: 12/108,166

(22) Filed: Apr. 23, 2008

(65) Prior Publication Data

US 2008/0266721 A1    Oct. 30, 2008

(30) Foreign Application Priority Data

Apr. 25, 2007   (JP) ................................. P2007-116121

(51) Int. Cl.
*G11B 5/127* (2006.01)
(52) U.S. Cl. ................................. 360/125.27
(58) Field of Classification Search ........................ None
See application file for complete search history.

(56) References Cited

U.S. PATENT DOCUMENTS

| 2004/0190197 A1* | 9/2004 | Watabe et al. ................. 360/126 |
| 2006/0098338 A1* | 5/2006 | Watabe et al. ................. 360/126 |
| 2006/0176613 A1 | 8/2006 | Lim et al. |

FOREIGN PATENT DOCUMENTS

| JP | A-5-166130 | 7/1993 |
| JP | A-2000-331310 | 11/2000 |
| JP | A-2006-147058 | 6/2006 |
| JP | A-2006-221785 | 8/2006 |

* cited by examiner

*Primary Examiner* — David D Davis  
(74) *Attorney, Agent, or Firm* — Oliff & Berridge, PLC

(57) ABSTRACT

In a perpendicular magnetic recording head comprising a main magnetic pole layer, a return yoke layer, and an auxiliary yoke layer, a plurality of rear magnetic connecting layers intermittently extending to a connecting position with the return yoke layer are provided at the same lamination position as with the main magnetic pole layer on the rear side of the main magnetic pole layer in the height direction. The auxiliary yoke layer is formed by a plurality of divided auxiliary yoke layers intermittently extending on the rear side of the medium-opposing surface in the height direction and magnetically connecting the main magnetic pole layer to the plurality of rear magnetic connecting layers, respectively. In each of the main magnetic pole layer, plurality of rear magnetic connecting layers, and plurality of divided auxiliary yoke layers, the size in the track width direction is defined greater than the size in the height direction.

3 Claims, 7 Drawing Sheets

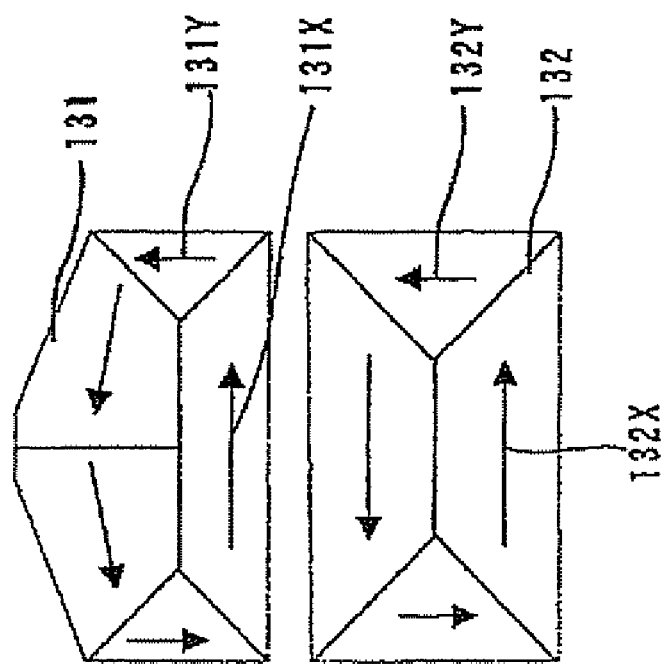
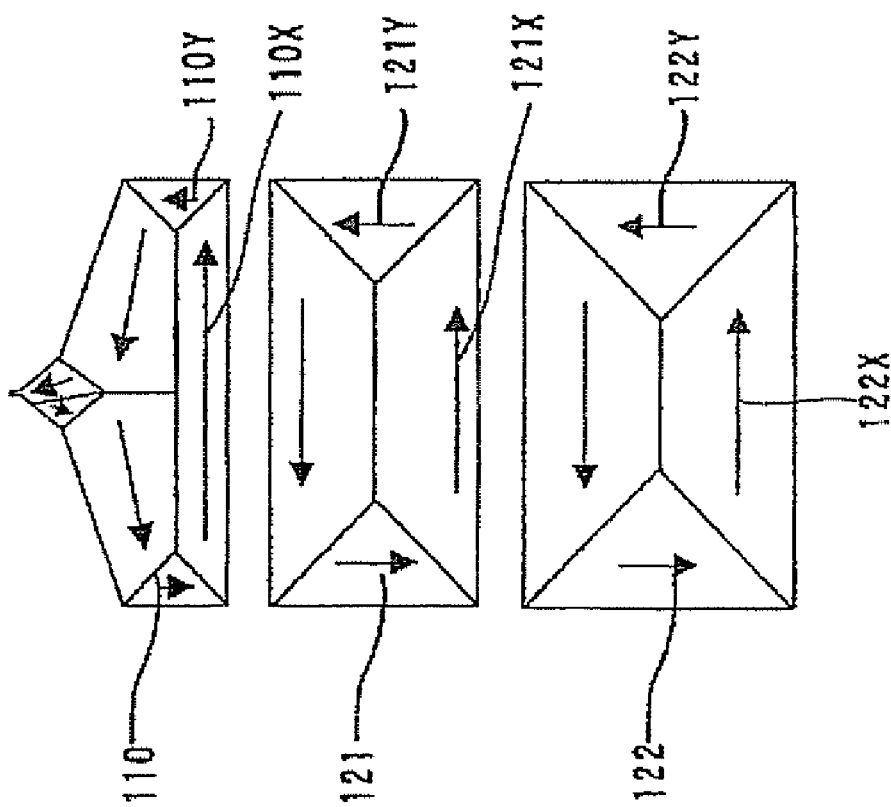

PERPENDICULAR MAGNETIC RECORDING HEAD WITH DIVIDED AUXILIARY YOKE LAYER

BACKGROUND OF THE INVENTION

1. Field of the Invention

The present invention relates to a perpendicular magnetic recording head which performs a recording action by applying a recording magnetic field perpendicularly to a recording medium plane.

2. Related Background Art

As is well-known, a perpendicular magnetic recording head includes a main magnetic pole layer and a return yoke layer which are laminated with a magnetic gap layer interposed therebetween on a surface opposing a recording medium (medium-opposing surface) and are magnetically coupled to each other on the rear side of the medium-opposing surface in the height direction, and a coil layer which is provided between the main magnetic pole layer and return yoke layer on the rear side of the medium-opposing surface in the height direction and generates a recording magnetic flux upon energization. The recording magnetic flux generated from the coil layer perpendicularly enters a hard magnetic film of the recording medium from the front end face of the main magnetic pole layer exposed at the medium-opposing surface and returns to the front end face of the return yoke layer exposed at the medium-opposing surface through a soft magnetic film of the recording medium. This performs magnetic recording at a part opposing the front end face of the main magnetic pole layer.

Known in such a perpendicular magnetic recording head is a structure equipped with a yoke layer having a large capacity formed on the upper or lower side of the main magnetic pole layer in order to augment the amount of magnetic fluxes accommodated in the main magnetic pole layer (Patent Document (Japanese Patent Application Laid-Open No. 2006-221785)). In this structure, magnetic fluxes generated from the coil layer at the time of a recording action are guided to the main magnetic pole layer through the yoke layer, so that the amount of magnetic fluxes released from the front end face of the magnetic pole layer exposed at the medium-opposing surface increases, whereby the recording magnetic field intensity can be enhanced.

When the recording magnetic field intensity is higher, however, the remanent magnetization in the main magnetic pole layer after the completion of the recording action also increases, whereby unintentional writing (pole lockup phenomenon) may be effected on the recording medium by magnetic fluxes leaking from the front end face of the main magnetic pole layer at the time of no recording action (when the coil layer is not energized). For preventing this phenomenon from occurring, it is necessary to define the domain structure of the main magnetic pole layer for stabilizing the magnetization in a direction orthogonal to the direction of the magnetic flux perpendicularly incident on the recording medium, i.e., track width direction, such that unnecessary magnetic fluxes are harder to leak at the time of no recording action. Examples of such a domain structure of the main magnetic pole layer are described in Patent Documents (Japanese Patent Application Laid-Open No. 2006-221785, Japanese Patent Application Laid-Open No. 05-166130, Japanese Patent Application Laid-Open No. 2000-331310, Japanese Patent Application Laid-Open No. 2006-147058).

SUMMARY OF THE INVENTION

Patent Document (Japanese Patent Application Laid-Open No. 2006-221785) describes that when a main magnetic pole layer including a first main magnetic pole layer part extending from a surface opposing a recording medium to a first position on the rear side and a second main magnetic pole layer part extending from a second position retracted from the first position to the rear side so as to be separated from the first main magnetic pole layer part is formed, while the first and second main magnetic pole layer parts are defined into a transversely elongated form in which the width is greater than the length, a domain structure in which the magnetization component of the main magnetic pole layer is dominant in the width direction because of magnetic shape anisotropy is obtained.

However, the auxiliary magnetic pole layer as a yoke layer in Patent Document (Japanese Patent Application Laid-Open No. 2006-221785) is provided with a longitudinally elongated form in which the length is greater than the width from the first main magnetic pole layer part to the second magnetic pole layer part and has a domain structure in which the magnetization component is dominant in the length direction because of the magnetic shape anisotropy. Therefore, the first and second main magnetic pole layer parts magnetically coupled to the auxiliary magnetic pole layer are susceptible to the direction of magnetization of the auxiliary magnetic pole layer, whereby the magnetization component is hard to stabilize in the width direction by the magnetic shape anisotropy.

It is an object of the present invention to provide a perpendicular magnetic recording head which makes it easy to control the domain of the main magnetic pole layer by the magnetic shape anisotropy and can prevent unintentional magnetic recording and erasing of the recording with respect to the recording medium.

The present invention is achieved by focusing attention on the facts that the magnetization component of the main magnetic pole layer is easy to stabilize in the track width direction by the magnetic shape anisotropy when two-dimensional forms of both of the main magnetic pole layer and auxiliary yoke layer are shaped into a transversely elongated form in which the size in the track width direction is greater than the size in the height direction. This transversely elongated form is obtained by dividing the main magnetic pole layer and auxiliary yoke layer each continuously formed from the medium-opposing surface (or a position retracted from the medium-opposing surface to the deeper side in the height direction) to a connecting position with the return yoke layer into a plurality of pieces and defining the size in the track width direction greater than the size in the height direction in each of the divided pieces. A magnetic connection between the main magnetic pole layer and return yoke layer can be secured when the divided pieces of the main magnetic pole layer and auxiliary yoke layer are alternately arranged along the height direction so as to connect with each other.

Namely, the present invention is a perpendicular magnetic recording head comprising a main magnetic pole layer for applying a recording magnetic field perpendicularly to a recording medium, a return yoke layer laminated with the main magnetic pole layer with a predetermined distance therebetween on a medium-opposing surface and magnetically coupled to the main magnetic pole layer on the rear side of the medium-opposing surface in a height direction, a coil layer provided between the main magnetic pole layer and the return yoke layer, and an auxiliary yoke layer for guiding a recording magnetic flux generated from the coil layer to the main magnetic pole layer. A plurality of rear magnetic connecting layers having respective positions in the height direction different from each other and intermittently extending to a first connecting position with the return yoke layer are provided on the rear side of the main magnetic pole layer in the height direction at the same lamination position as with the main magnetic pole layer. The auxiliary yoke layer is formed by a plurality of divided auxiliary yoke layers laminated on the main magnetic pole layer, the divided auxiliary yoke layers intermittently extending from a rear end of the main magnetic pole layer in the height direction to a second connecting position with the return yoke layer and magnetically coupling the main magnetic pole layer to the plurality of rear magnetic connecting layers, respectively. Each of the main magnetic pole layer, the plurality of rear magnetic connecting layers, and the plurality of divided auxiliary yoke layers has a size in a track width direction greater than a size in the height direction.

The plurality of divided auxiliary yoke layers may be formed either at the same lamination position or different lamination positions. It will be practical if the plurality of divided auxiliary yoke layers formed at different lamination positions become a multilayer body having a first group of divided auxiliary yoke layers laminated on the main magnetic pole layer and the plurality of rear magnetic connecting layers and a second group of divided auxiliary yoke layers adjoining the first group of divided auxiliary yoke layers at a lamination position different from that of the first group of divided auxiliary yoke layers and magnetically connecting the first group of divided auxiliary yoke layers to each other.

In the present invention the size in the track width direction is defined longer than the size in the height direction in each of the main magnetic pole layer and a plurality of rear magnetic connecting layers and a plurality of auxiliary magnetic layers which intermittently extend along the height direction from the rear side of the main magnetic pole layer in the height direction to a connecting position with the return yoke layer, whereby the magnetization components in the main magnetic pole layer, plurality of rear magnetic connecting layers, and plurality of auxiliary magnetic layers can be stabilized in the track width direction. This yields a perpendicular magnetic recording head which reduces leakage magnetic fluxes perpendicularly entering the recording medium from the front end face of the main magnetic pole layer at the time of no recording action, thereby making it possible to prevent unintentional magnetic recording and erasing of the recording with respect to the recording medium.

BRIEF DESCRIPTION OF THE DRAWINGS

FIG. 7A is a schematic view for explaining a domain structure of the main magnetic pole layer and first and second rear magnetic connecting layers; and FIG. 7B is a schematic view for explaining a domain structure of the first and second divided auxiliary yoke layers.

DESCRIPTION OF THE PREFERRED EMBODIMENTS

In the following, the present invention will be explained with reference to the drawings. In each drawing, X, Y, and Z directions are defined by the track width direction, the height direction, and the laminating direction (thickness direction) of layers constituting a perpendicular magnetic recording head, respectively.

Figure 1:
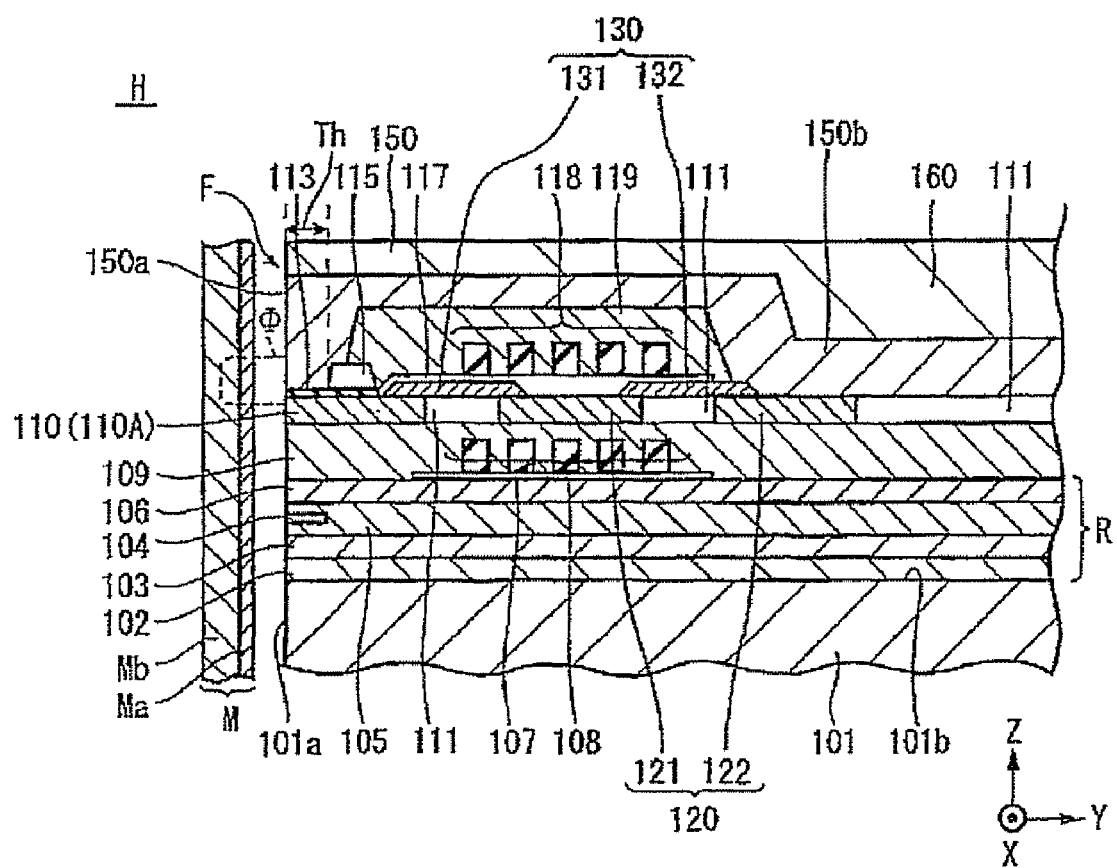
FIG. 1 is a sectional view showing the overall structure of the perpendicular magnetic recording head in accordance with an embodiment of the present invention.
Figure 2:
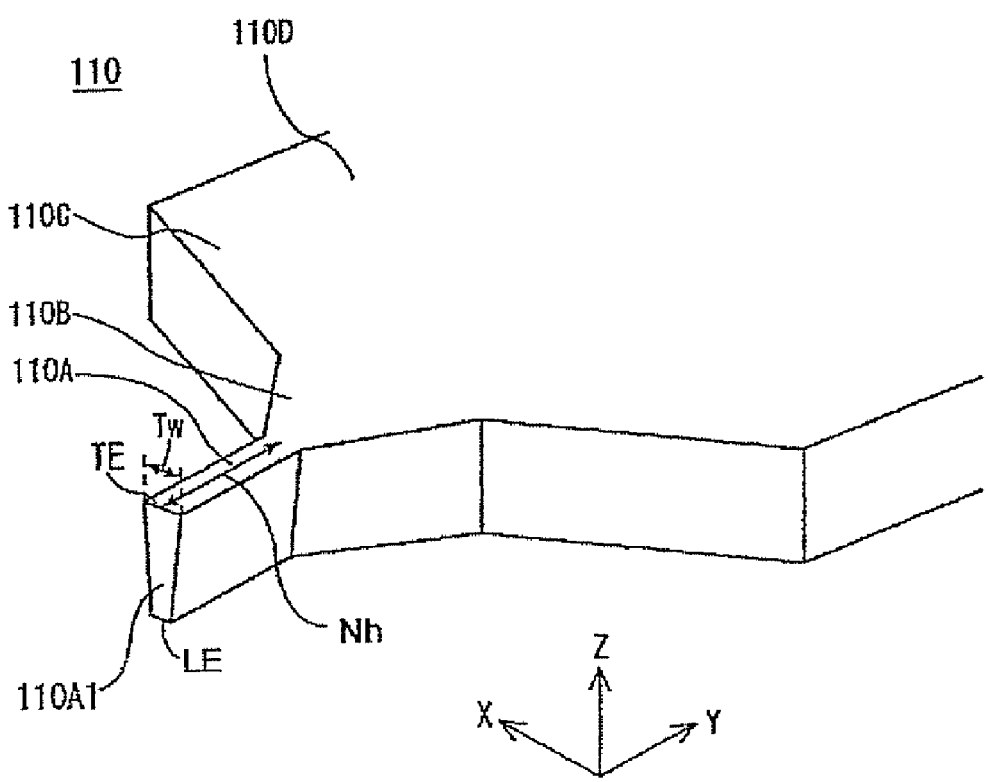
FIG. 2 is a perspective view for explaining the main magnetic pole layer form.

FIGS. 1 to 4 show the perpendicular magnetic recording head H in accordance with an embodiment of the present invention. FIG. 1 is a vertical sectional view showing the overall structure of the perpendicular magnetic recording head R whereas FIG. 2 is a schematic perspective view for explaining the form of the main magnetic pole layer 110.

The perpendicular magnetic recording head H provides a recording medium M with a recording magnetic flux Φ perpendicular thereto, thereby perpendicularly magnet g a hard magnetic film Ma of the recording medium M. The recording medium M has the hard magnetic film Ma with a higher remanent magnetization on the medium surface side and a soft magnetic film Mb with a higher magnetic permeability on the inner side of the hard magnetic film Ma. The recording medium M is shaped like a disk, for example, and is rotated about the center of the disk as a rotary axis. A slider 101 is formed by a nonmagnetic material such as $Al_2O_3.TiC$. The slider 101 has a medium-opposing surface 101a opposing the recording medium M. As the recording medium M rotates, a surface airflow levitates the slider 101 from the surface of the recording medium M.

The trailing-side end face 101b of the slider 101 is formed with a nonmagnetic insulating layer 102 made of an inorganic material such as $Al_2O_3$ or $SiO_2$, while a reproducing part R is formed on the nonmagnetic insulating layer 102. The reproducing part R has a lower shield layer 103, an upper shield layer 106, an inorganic insulating layer (gap insulating layer) 105 filling the gap between the lower and upper shield layers 103, 106, and a reproducing device 104 positioned with the inorganic insulating layer 105. The reproducing device 104 is a magnetoresistive device such as AMR, GMR, or TMP.

By way of a coil insulating foundation layer 107, a first coil layer 108 constituted by a plurality of lines made of a conductive material is formed on the upper shield layer 106. The first coil layer 108 is made of at least one nonmagnetic metal material selected from Au, Ag, Pt, Cu, Cr, Al, Vi, NiP, Mo, Pd, and Rh, for example. It may have a multilayer structure in which such nonmagnetic metal materials are laminated. A coil insulating layer 109 made of $Al_2O_3$, $SiO_2$, or the like is formed about the first coil layer 108.

The upper face of the coil insulating layer 109 is made flat. An undepicted plating foundation layer is formed on the flat surface, while a main magnetic pole layer 110 made of a ferromagnetic material having a high saturated magnetic flux density such as Ni—Fe, Co—Fe, or Ni—Fe—Co is formed on the plating foundation layer.

As shown in FIG. 2, the main magnetic pole layer 110 has a pole straight part (magnetic pole part) 110A, a 1st flare part 110B, a 2nd flare part 110C, and a base part 110D successively from the medium-opposing surface F side. The pole straight part 110A has a front end face 110A1 exposed at the medium-opposing surface F. Its size in the track width direction at the trailing edge TE is defined by a recording track width Tw, while its size in the height direction is defined by a predetermined neck height Nh. The pole straight part 110A uniformly yields a trapezoidal (bevel) form which is narrower on the leading edge LE side than on the trailing edge side TE throughout its length when seen from the medium-opposing surface F. Beveling the pole straight part 110A can reduce leakage magnetic fields reaching from the leading edge LE side to the recording medium M, thereby yielding the side fringing suppressing effect. The 1st flare part 110B is an area for narrowing the recording magnetic field from the base part 110D to the pole straight part 110A and expands the size in the track width direction from the pole straight part 110A to the deeper side in the height direction. The 2nd flare part 110C is an area for adjusting a domain structure generated in the base part 110D after excitation such that it is oriented in the track width direction, and joins the 1st flare part 110B and the base part 110D to each other. The main magnetic pole layer 110 is not formed on the whole coil insulating layer 109 but locally on only the medium-opposing surface F side thereof, and is magnetically connected to an auxiliary yoke layer 130 at the base part 110D.

The auxiliary yoke layer 130 is made of a magnetic material having a saturated magnetic flux density lower than that of the main magnetic pole layer 110 and transmits a recording magnetic flux generated by the recording coil (first and second coil layers 108, 118) to the main magnetic pole layer 110. A nonmagnetic material layer 111 is formed about the main magnetic pole layer 110, and is made flat such that the upper face of the main magnetic pole layer 110 is flush with the upper face of the nonmagnetic material layer 111.

On the medium-opposing surface F side, a magnetic gap layer 113 made of an inorganic nonmagnetic insulating material such as $Al_2O_3$ or $SiO_2$, for example, is formed on the main magnetic pole layer 110 by a thickness corresponding to a predetermined gap distance. The thickness of the magnetic gap layer 113 is about 40±20 nm at present. On the magnetic gap layer 113, a height determining layer 115 is formed at a position retracted from the medium-opposing surface F by a predetermined throat height Th to the deeper side in the height direction, while the second coil layer 118 is formed on the deeper side of the height determining layer 115 in the height direction by way of a coil insulating foundation layer 117.

As with the first coil layer 108, the second coil layer 118 is formed by a plurality of lines made of a conductive material. For example, the second coil layer 118 is made of at least one nonmagnetic metal material selected from Au, Ag, Pt, Cu, Cr, Al, Ti, NiP, Mo, Pd, and Rh. It may have a multilayer structure in which such nonmagnetic metal materials are laminated. The first and second coil layers 108, 118 are electrically connected to each other at their end parts in the track width direction (depicted X direction) so as to form a solenoid. The form of coil layers (magnetic field generating means) is not limited to the solenoid form, though. A coil insulating layer 119 is formed about the second coil layer 118.

A return yoke layer 150 made of a ferromagnetic material having a high saturated magnetic flux density such as Ni—Fe, Co—Fe, or Ni—Fe—Co is formed such as to extend over the coil insulating layer 119, height determining layer 115, and magnetic gap layer 113. The run yoke layer 150 has a front end face 150a, which is exposed at the medium-opposing surface F and opposes the pole straight part 110A of the main magnetic pole layer 110 while interposing the magnetic gap layer 113 therebetween, and a connecting part 150b magnetically connecting with the base part 110D of the main magnetic pole layer 110 through the auxiliary yoke layer 130 on the deeper side in the height direction. The throat height Th of the return yoke layer 150 is determined by the height determining layer 115. The return yoke layer 150 is covered with a protecting layer 160 made of an inorganic nonmagnetic insulating material.

In the perpendicular magnetic recording head H having the foregoing overall structure, the base part 110D of the main magnetic pole layer 110 and the connecting part 150b of the return yoke layer 150 are magnetically coupled to each other through the auxiliary yoke layer 130 and a plurality of rear magnetic connecting layers 120.

Figure 3:
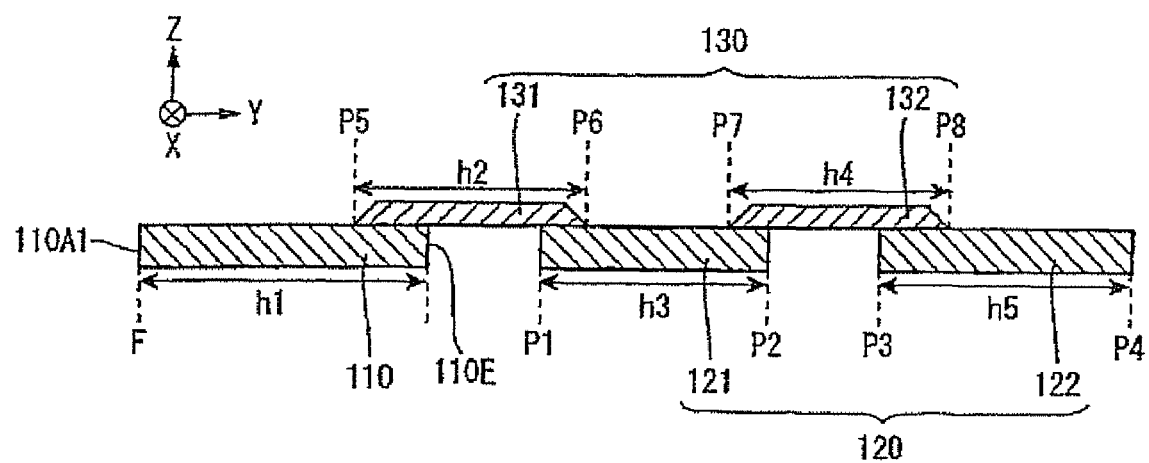
FIG. 3 is a sectional view showing a multilayer structure of the main magnetic pole layer, plurality of rear magnetic connecting layers, and plurality of divided auxiliary yoke layers in FIG. 1 under magnification.
Figure 4:
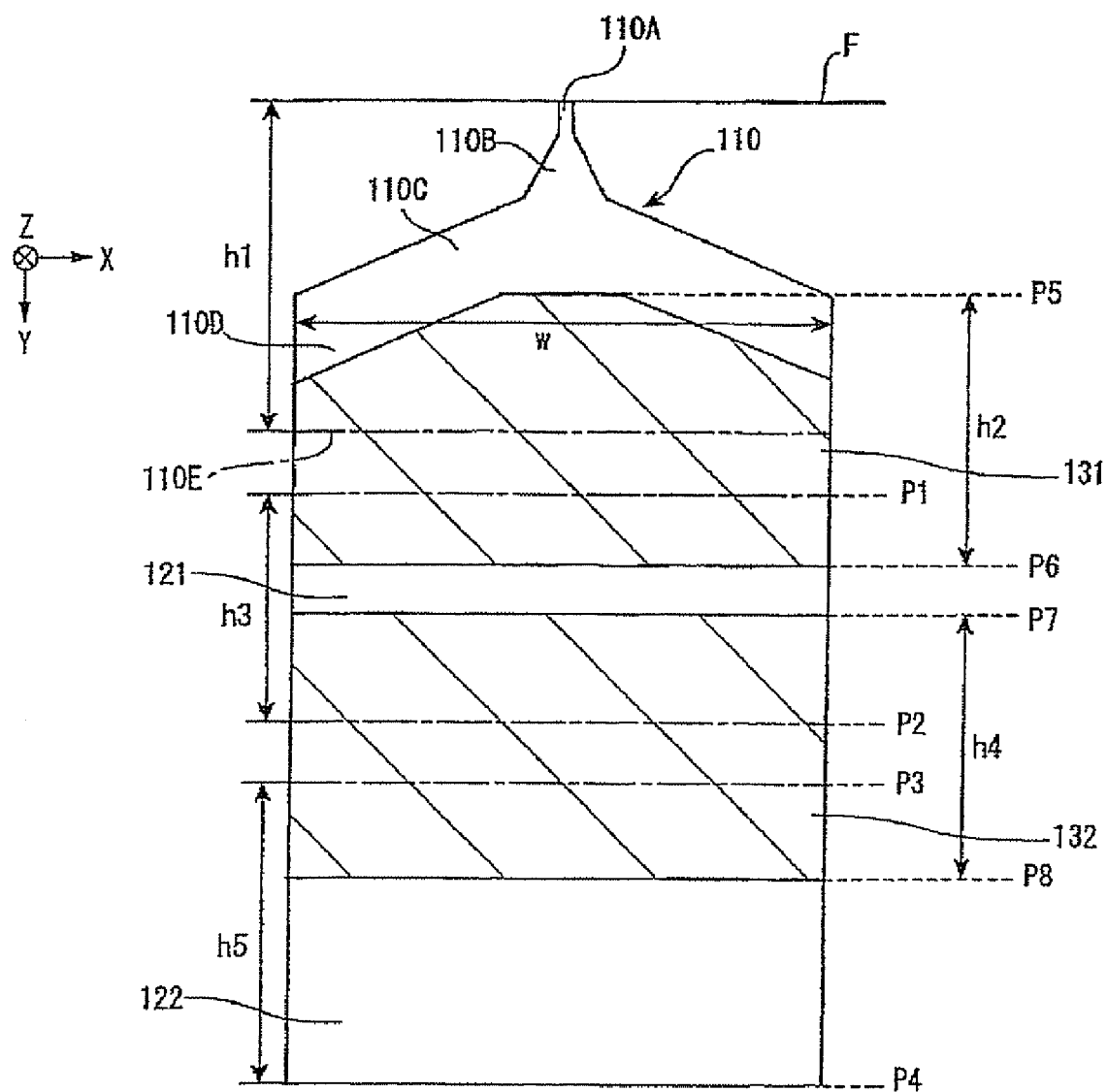
FIG. 4 is a plan view showing two-dimensional forms of the main magnetic pole layer, plurality of rear magnetic connecting layers, and plurality of divided auxiliary yoke layers in a superposed manner

With reference to FIGS. 3 and 4, the main magnetic pole layer 110, plurality of rear magnetic connecting layers 120, and auxiliary yoke layer 30 will now be explained in detail. FIG. 3 is a partly enlarged sectional view showing the main magnetic pole layer 110, plurality of rear magnetic connecting layers 120, and auxiliary yoke layer 130 extracted from FIG. 1, whereas FIG. 4 is a plan view showing two-dimensional forms of the main magnetic pole layer 110, plurality of rear magnetic connecting layers 120, and auxiliary yoke layer 130 in a superposed manner. The auxiliary yoke layer 130 is hatched in FIG. 4.

The main magnetic pole layer 110 is locally formed on the medium-opposing surface F side as mentioned above, while the size w in the track width direction is defined greater than the size h1 in the height direction (w>h1). Here, the size w in the track width direction of the main magnetic pole layer 110 is the size in the track width direction of the base part 110D, and the size h1 in the height direction of the main magnetic pole layer 110 is the size in the height direction from the front face 110A1 exposed at the medium-opposing surface F to the rear end 110E in the height direction. By defining the size w in the track width direction greater than the size h1 in the height direction, the main magnetic pole layer 110 attains a domain structure in which the main magnetic pole layer 110 is easy to magnetize in a direction parallel to the track width direction. For making it easy to magnetize in a direction parallel to the track width direction, the size w in the track width direction of the main magnetic pole layer 110 is desirably at least two times the size h1 in the height direction.

The plurality of rear magnetic connecting layers 120 are made of the same magnetic material as with the main magnetic pole layer 110, specific examples of which include ferromagnetic materials having a high saturated magnetic flux density such as Ni—Fe, Co—Fe, and Ni—Fe—Co, and function as a magnetically connecting part for connecting the main magnetic pole layer 110, auxiliary yoke layer 130, and return yoke layer 150 to each other.

The plurality of rear magnetic connecting layers 120 are constituted by a first rear magnetic connecting layer 121 and a second rear magnetic connecting layer 122 which are formed at the same lamination position as with the main magnetic pole layer 110 at respective positions different from each other in the height direction on the rear side of the main magnetic pole layer 110 in the height direction. The main magnetic pole layer 110, f rear magnetic connecting layer 121, and second rear magnetic connecting layer 122 are not physically continuous to each other in the same layer but are separated from each other in the height direction. The nonmagnetic material layer 111 is interposed between the first rear magnetic connecting layer 121 and main magnetic pole layer 110 and between the first rear magnetic connecting layer 121 and second rear magnetic connecting layer 122. Each of the main magnetic pole layer 110, first rear magnetic connecting layer 121, and second rear magnetic connecting layer 122 has a thickness of about 250±100 nm.

The first rear magnetic connecting layer 121 on the main magnetic pole layer 110 side extends from a position P1 on the rear side in the height direction of the rear end 110E in the height direction of the main magnetic pole layer 110 to a position P2 and has a transversely elongated rectangular form in which the size w in the track width direction is longer than the size h3 (distance between the positions P1 and P2) in the height direction. On the other hand, the second rear magnetic connecting layer 122 on the return yoke layer 150 side extends from a position P3 on the rear side in the height direction of the first rear magnetic connecting layer 121 to a first connecting position P4 (under the connecting part 150b) with the return yoke layer 150 and has a transversely elongated rectangular form in which the size w in the track width direction is longer than the size h5 (distance between the positions P3 and P4) in the height direction. The transversely elongated rectangular form yields magnetic shape anisotropy in a direction parallel to the track width direction in each of the first and second rear magnetic connecting layers 121, 122. Therefore, each of the first and second rear magnetic connecting layers 121, 122 attains a domain structure in which each of the first and second rear magnetic connecting layers 121, 122 is easy to magnetize in a direction parallel to the track width direction (FIG. 7A). For making them easy to magnetize in a direction parallel to the track width direction, the size w in the track width direction of the first and second rear magnetic connecting layers 121, 122 is desirably at least two times the size h3 or h5 in the height direction.

The size w in the track width direction of the first and second rear magnetic connecting layers 121, 122 is the same as the size in the track width direction of the main magnetic pole layer 110, whereby both end positions in the track width direction of the first and second rear magnetic connecting layers 121, 122 coincide with both end positions in the track width direction of the main magnetic pole layer 110, respectively.

As mentioned above, the auxiliary yoke layer 130 is made of a magnetic material having a saturated magnetic flux density lower than that of the main magnetic pole layer 110 and functions to supply the recording magnetic flux generated from the recording coil (first and second coil layers 108, 118) to the main magnetic pole layer 110. The thickness of the auxiliary yoke layer 130 is about 300±1200 nm.

The auxiliary yoke layer 130 is constituted by a first divided auxiliary yoke layer 131 and a second divided auxiliary yoke layer 132 which intermittently extend from the base part 110D of the main magnetic pole layer 110 to a connecting position with the return yoke layer 150. The first divided auxiliary yoke layer 131 and second divided auxiliary yoke layer 132 are laminated on the main magnetic pole layer 110 at different positions in the height direction and are not physically continuous in the same layer. The coil insulating foundation layer 117 is interposed between the first and second divided auxiliary yoke layers 131, 132.

The first divided auxiliary yoke layer 131 is formed so as to extend from a position P5 between the medium-opposing surface F and the rear end 110E of the main magnetic pole layer 110 in the height direction to a position P6 on the rear side of the position P1 in the height direction and bridge the main magnetic pole layer 110 and first rear magnetic connecting layer 121. In the first divided auxiliary yoke layer 131, the width w in the track width direction is defined greater than the size h2 (distance between the positions P5 and P6) in the height direction, whereby a transversely elongated base form having taper surfaces corresponding to the 2nd flare part 110C of the main magnetic pole layer 110 on the medium-opposing surface F side is exhibited. On the other hand, the second divided auxiliary yoke layer 132 is formed so as to extend from a position P7 on the rear side of the first divided auxiliary yoke layer 131 in the height direction to a second connecting position P8 (under the connecting part 150b) with the return yoke layer 150 and bridge the first and second rear magnetic connecting layers 121, 122. The second divided auxiliary yoke layer 132 has a transversely elongated rectangular form in which the size w in the track width direction is greater than the size h4 (distance between the positions P7 and P8) in the height direction. The transversely elongated rectangular form yields magnetic shape anisotropy in a direction parallel to the track width direction in each of the first and second divided auxiliary yoke layers 131, 132. Therefore, each of the first and second divided auxiliary yoke layers 131, 132 attains a domain structure in which each of the first and second divided auxiliary yoke layers 131, 132 is easy to magnetize in a direction parallel to the track width direction FIG. 7B). For making them easy to magnetize in a direction parallel to the track width direction, the size w in the track width direction of the first and second divided auxiliary yoke layers 131, 132 is desirably at least two times the size h2 or h4 in the height direction. Though the first divided auxiliary yoke layer 131 may be formed into a transversely elongated rectangular shape as with the second divided auxiliary yoke layer 132, a transversely elongated base form having taper surfaces corresponding to the 2nd flare part 110C of the main magnetic pole layer 110 an the medium-opposing surface F side as in this embodiment can more efficiently narrow magnetic fluxes at the leading end of the auxiliary yoke, thereby tardier enhancing the recording magnetic field intensity.

In each of the first and second divided auxiliary yoke layers 131, 132, the size w in the track width direction is the same as that of each of the main magnetic pole layer 110 and the first and second rear magnetic connecting layers 121, 122, while both end positions in the track width direction coincide with those of each of the main magnetic pole layer 110 and the first and second rear magnetic connecting layers 121, 122. When seen two-dimensionally, as shown in FIG. 4, the fast and second divided auxiliary yoke layers 131, 132 are superposed on the main magnetic pole layer 110, first rear magnetic connecting layer 121, and second rear magnetic connecting layer 122.

The main magnetic pole layer 110, first rear magnetic connecting layer 121, and second rear magnetic connecting layer 122 positioned in the same layer and the first and second divided auxiliary yoke layers 131, 132 positioned in the same layer alternately connect with each other along the height direction. In other words, the main magnetic pole layer 110, first divided auxiliary yoke layer 131, first rear magnetic connecting layer 121, second divided auxiliary yoke layer 132, and second rear magnetic connecting layer 122 are successively arranged from the medium-opposing surface F to the rear side in the height direction, so as to be magnetically connected from the main magnetic pole layer 110 to the rear magnetic connecting layer 122. The connecting part 150b of the return yoke layer 150 is connected to the second rear magnetic connecting layer 122 and second divided auxiliary yoke layer 132.

Operation effects of the perpendicular magnetic recording head H comprising the main magnetic pole layer 110, plurality of rear magnetic connecting layers 120 (first and second rear magnetic connecting layers 121, 122), and auxiliary yoke layer 130 (first and second divided auxiliary yoke layers 131, 132) will now be explained.

A recording action begins in the perpendicular magnetic recording head H when energization to the recording coil (first and second coil layers 108, 118) is started by undepicted current control means. A recording magnetic flux generated from the recording coil upon energization is transmitted to the base part 110D of the main magnetic pole layer 110 through a plurality of divided auxiliary yoke layers 130 (first and second divided auxiliary yoke layers 131, 132) and a plurality of rear magnetic connecting layers 120 (first and second rear magnetic connecting layers 121, 122), narrowed through the 2nd flare part 110C and 1st flare part 110B from the base part 110D, and then released from the front end face 110A1 of the pole straight part 110A to the recording medium M. Here, a recording magnetic field Φ occurs in a direction perpendicular to the recording medium M (medium surface), thereby recording magnetic information onto the recording medium M. After desirable magnetic information is recorded, the recording action is terminated by stopping the energization to the recording coil (first and second coil layers 108, 118) with the undepicted current control means.

When the release of the recording magnetic flux from the front end face 110A1 of the main magnetic pole layer 110 to the recording medium M is stopped as the recording action is terminated, the magnetic flux supplied to the main magnetic pole layer 110 before terminating the recording action remains in the main magnetic pole layer 110. If the main magnetic pole layer 110 has a domain structure in which the main magnetic pole layer 110 is easy to magnetize in a direction parallel to the height direction here, the magnetic flux (remanent magnetization) remaining in the main magnetic pole layer 110 will be likely to leak out from the front end face 110A1, thereby effecting unintentional magnetic recording and erasing of the recording with respect to the recording medium M at the time of no recording action.

In the perpendicular magnetic recording head H, by contrast, the size win the track width direction is defined greater than each of the sizes h1 to h5 in the height direction in not only the main magnetic pole layer 110 but also all of the first and second rear magnetic connecting layers 121, 122 and first and second divided auxiliary yoke layers 131, 132 magnetically connected to the main magnetic pole layer 110, so as to generate magnetic shape anisotropy in a direction parallel to the track width direction, whereby a domain structure in which each of the main magnetic pole layer 110, the first and second rear magnetic connecting layers 121, 122, and the first and second divided auxiliary yoke layers 131, 132 is easy to magnetize in a direction parallel to the track width direction is attained as shown in FIG. 7A and FIG. 7B. In other words, the ratio occupied by magnetization components (110X, 121X, 122X, 131X, 132X) parallel to the track width direction becomes greater than that occupied by magnetization components (110Y, 121Y, 122Y, 131Y, 132Y) parallel to the height direction, whereby the former magnetization components are dominant in the respective domain structures of the layers. Therefore, the domain structure of the main magnetic pole layer 110 can easily be controlled such as to be easy to magnetize in a direction parallel to the track width direction not only by the magnetic shape anisotropy of the main magnetic pole layer 110 itself but also by the magnetic shape anisotropy of the magnetic layers (first and second rear magnetic connecting layers 121, 122 and first and second divided auxiliary yoke layers 131, 132) magnetically connected to the main magnetic pole layer 110. Such a domain structure stabilizing the direction of magnetization of the main magnetic pole layer 110 in a direction parallel to the track width direction lowers the possibility that the magnetic flux remaining in the main magnetic pole layer 110 may leak out from the front end face 110A1. This can restrain recording magnetic fields perpendicular to the recording medium M from occurring, thereby preventing unintentional magnetic recording and erasing of the recording with respect to the recording medium M.

Figure 5:
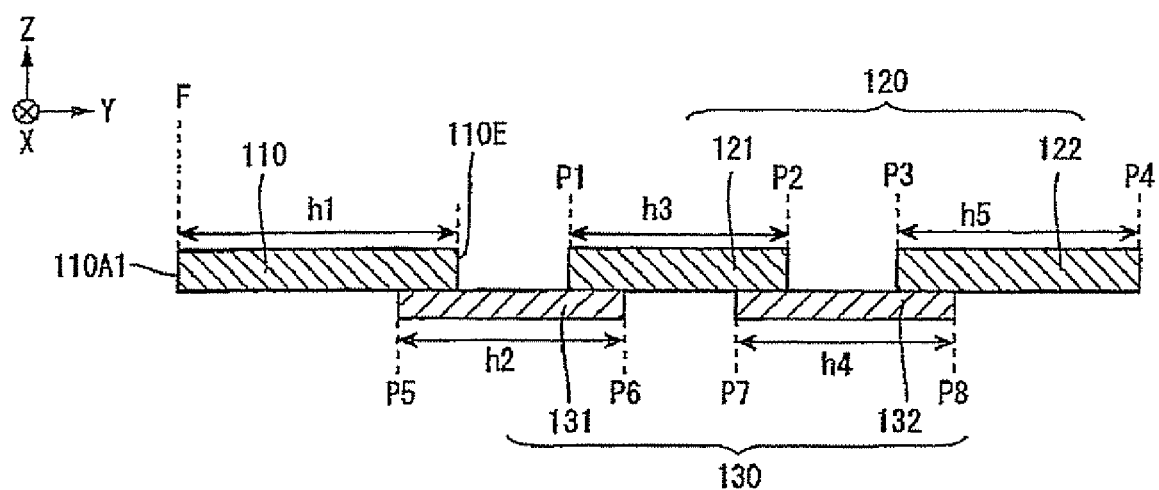
FIG. 5 is a sectional view showing an embodiment in which first and second divided auxiliary yoke layers are laminated under the main magnetic pole layer as a modified example of the plurality of divided auxiliary yoke layers.

Though the auxiliary yoke layer 130 (constituted by the first and second divided auxiliary yoke layers 131, 132) is laminated on the main magnetic pole layer 110 in this embodiment, the first and second divided auxiliary yoke layers 131, 132 may be laminated under the main magnetic pole layer 110 as shown in FIG. 5.

Figure 6:
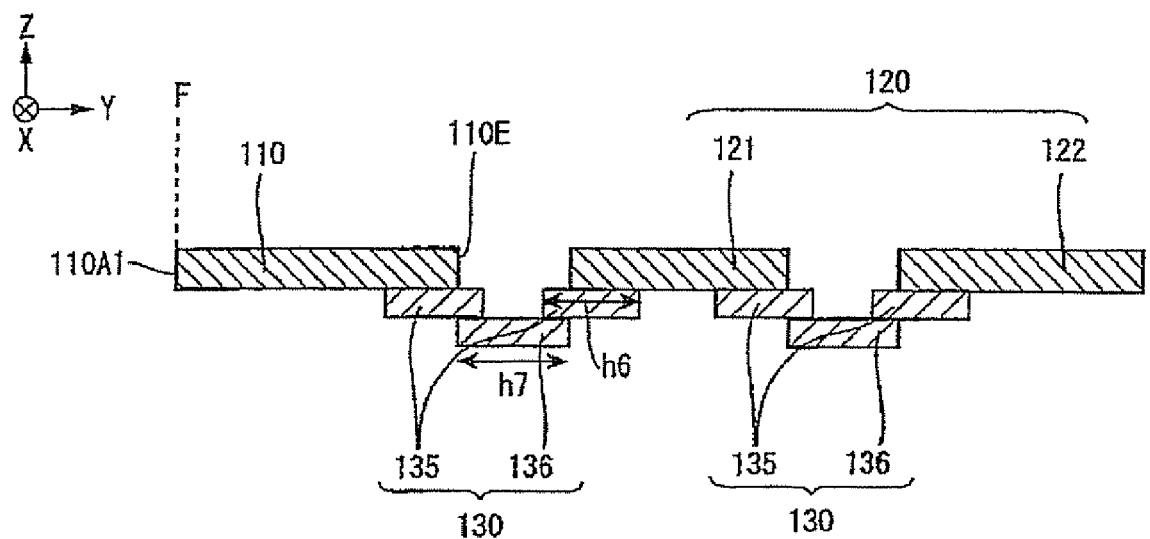
FIG. 6 is a sectional view showing an embodiment in which a plurality of divided auxiliary yoke layers are provided in a two-stage structure at different lamination positions as a modified example of the plurality of divided auxiliary yoke layers.

Though a plurality of divided auxiliary yoke layers (first and second divided auxiliary yoke layers 131, 132) are provided at the same lamination position in this embodiment they may be provided at different lamination positions as shown in FIG. 6. In the embodiment of FIG. 6, the auxiliary yoke layer 130 forms a multilayer body with a two-stage structure having a first group of divided auxiliary yoke layers 135 laminated on the main magnetic pole layer 110 and the first and second rear magnetic connecting layers 121, 122, and a second group of divided auxiliary yoke layers 136 magnetically connecting the adjacent first group of divided auxiliary yoke layers 135 to each other at a lamination position different from that of the first group of divided auxiliary yoke layers 135. Each of the first and second groups of divided auxiliary yoke layers 135, 136 is formed into a transversely elongated shape in which the size in the track width direction is defined greater than the size h6 or h7 in the height direction as with each of the first and second divided auxiliary yoke layers 131, 132 in FIG. 3 and FIG. 4. The second group of divided auxiliary yoke layers 136 may further be divided into two or more stages.

Though the above-mentioned embodiment comprises two rear magnetic connecting layers 121, 122 and two divided auxiliary yoke layers 131, 132, the rear magnetic connecting layer 120 and auxiliary yoke layer 130 may be formed by three or more rear magnetic connecting layers and divided auxiliary yoke layers.

What is claimed is:

1. A perpendicular magnetic recording head comprising a main magnetic pole layer for applying a recording magnetic field perpendicularly to a recording medium, a return yoke layer laminated with the main magnetic pole layer with a predetermined distance therebetween on a medium-opposing surface and magnetically coupled to the main magnetic pole layer on the rear side of the medium-opposing surface in a height direction, a coil layer provided between the main magnetic pole layer and the return yoke layer, and an auxiliary yoke layer for guiding a recording magnetic flux generated from the coil layer to the main magnetic pole layer;

wherein a plurality of rear magnetic connecting layers having respective positions in the height direction different from each other and intermittently extending to a first connecting position with the return yoke layer are provided on the rear side of the main magnetic pole layer in the height direction at the same lamination position as with the main magnetic pole layer;

wherein the auxiliary yoke layer is formed by a plurality of divided auxiliary yoke layers laminated on the main magnetic pole layer, the divided auxiliary yoke layers intermittently extending from a rear end of the main magnetic pole layer in the height direction to a second connecting position with the return yoke layer and magnetically coupling the main magnetic pole layer to the plurality of rear magnetic connecting layers, respectively; and wherein each of the main magnetic pole layer, the plurality of rear magnetic connecting layers, and the plurality of divided auxiliary yoke layers has a size in a track width direction greater than a size in the height direction.

2. A perpendicular magnetic recording head according to claim 1, wherein the plurality of divided auxiliary yoke layers are formed at the same lamination position.

3. A perpendicular magnetic recording head according to claim 1, wherein the plurality of divided auxiliary yoke layers are formed by a multilayer body having a first group of divided auxiliary yoke layers laminated on the main magnetic pole layer and the plurality of rear magnetic connecting layers and a second group of divided auxiliary yoke layers adjoining the first group of divided auxiliary yoke layers at a lamination position different from that of the first group of divided auxiliary yoke layers and magnetically connecting the first group of divided auxiliary yoke layers to each other.

* * * * *